(12) United States Patent
Lewis et al.

(10) Patent No.: US 10,988,661 B2
(45) Date of Patent: Apr. 27, 2021

(54) MITIGATION OF ANNULAR PRESSURE BUILD-UP USING TREATMENT FLUIDS COMPRISING CALCIUM ALUMINATE CEMENT

(71) Applicant: Halliburton Energy Services, Inc., Houston, TX (US)

(72) Inventors: Samuel J. Lewis, Spring, TX (US); Kyriacos Agapiou, Houston, TX (US); Thomas Jason Pisklak, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/580,199

(22) PCT Filed: Jul. 10, 2015

(86) PCT No.: PCT/US2015/039885
§ 371 (c)(1),
(2) Date: Dec. 6, 2017

(87) PCT Pub. No.: WO2017/010967
PCT Pub. Date: Jan. 19, 2017

(65) Prior Publication Data
US 2018/0171205 A1    Jun. 21, 2018

(51) Int. Cl.
*C09K 8/467* (2006.01)
*C04B 28/06* (2006.01)
(Continued)

(52) U.S. Cl.
CPC ............. *C09K 8/467* (2013.01); *C04B 28/06* (2013.01); *C09K 8/05* (2013.01); *C09K 8/40* (2013.01);
(Continued)

(58) Field of Classification Search
CPC ...................................................... E21B 43/26
See application file for complete search history.

(56) References Cited

U.S. PATENT DOCUMENTS 4,683,003 A * 7/1987 Nakano ................... C04B 28/06
106/677
4,883,125 A * 11/1989 Wilson ..................... C09K 8/24
166/291

(Continued)

FOREIGN PATENT DOCUMENTS

| CA | 2959125 | 6/2016 |
| WO | 2005080746 A1 | 9/2005 |

(Continued)

OTHER PUBLICATIONS

Calcium Aluminate Mineral Suspensions, an Innovative Liquid Binder for Construction and Coating Industries, Presented by Pascal Taquet on Mar. 21, 2013.

(Continued)

*Primary Examiner* — William D Hutton, Jr.
*Assistant Examiner* — Avi T Skaist
(74) *Attorney, Agent, or Firm* — Thomas Rooney; C. Tumey Law Group PLLC

(57) ABSTRACT

Methods, compositions, and systems for treating a well are included. A method comprises introducing a treatment fluid comprising a calcium aluminate cement, a cement set retarder, and water into a wellbore. The method further comprises removing a portion of the treatment fluid from the wellbore.

21 Claims, 3 Drawing Sheets

(51) Int. Cl.
*E21B 33/14* (2006.01)
*E21B 33/13* (2006.01)
*C09K 8/40* (2006.01)
*C09K 8/05* (2006.01)
*C04B 111/10* (2006.01)
*C04B 22/00* (2006.01)
*C04B 24/06* (2006.01)
*C04B 103/22* (2006.01)
*C04B 103/40* (2006.01)

(52) U.S. Cl.
CPC ............. *E21B 33/13* (2013.01); *E21B 33/14* (2013.01); *C04B 22/0013* (2013.01); *C04B 24/06* (2013.01); *C04B 2103/22* (2013.01); *C04B 2103/408* (2013.01); *C04B 2111/10* (2013.01)

(56) References Cited

U.S. PATENT DOCUMENTS

| | | | | |
|---|---|---|---|---|
| 5,488,991 | A * | 2/1996 | Cowan | C04B 24/243 106/696 |
| 7,326,290 | B2 | 2/2008 | Guinot et al. | |
| 2006/0086502 | A1* | 4/2006 | Reddy | C04B 28/02 166/291 |
| 2008/0028995 | A1* | 2/2008 | Barlet-Gouedard | C04B 28/006 106/811 |
| 2008/0182764 | A1 | 7/2008 | Xu et al. | |
| 2009/0114126 | A1 | 5/2009 | Roddy et al. | |
| 2010/0175589 | A1 | 7/2010 | Charpentier et al. | |
| 2010/0240556 | A1 | 9/2010 | Keys et al. | |
| 2013/0255542 | A1* | 10/2013 | Clodic et al. | C04B 7/32 106/695 |
| 2014/0011908 | A1 | 1/2014 | Reddy et al. | |
| 2014/0034314 | A1* | 2/2014 | Lewis | C04B 28/18 166/292 |
| 2014/0109799 | A1* | 4/2014 | Revil | C04B 28/06 106/676 |
| 2017/0247983 | A1 | 8/2017 | Funkhouser et al. | |

FOREIGN PATENT DOCUMENTS

| | | |
|---|---|---|
| WO | 2012076841 A1 | 6/2012 |
| WO | 2013169533 A1 | 11/2013 |
| WO | 2015094218 A1 | 6/2015 |
| WO | 2016057045 A1 | 4/2016 |
| WO | 2016089423 A1 | 6/2016 |
| WO | 2017007448 A1 | 1/2017 |
| WO | 2017007473 A1 | 1/2017 |

OTHER PUBLICATIONS

International Search Report and Written Opinion for Application No. PCT/US15/39885 dated Sep. 30, 2015.
Canadian Examination Report for Application No. 2,987,722 dated Oct. 25, 2018.
Australian Examination Report for Application No. 2015402147 dated Mar. 10, 2020.
Calvert et al., "OTC-6310, API Oilwell Cementing Practices", Offshore Technology Conference, 1990, pp. 97-112.
Shryock et al., "Geothermal Cementing—The State of the Art", Halliburton Services Brochure C-1274, pp. 12-1-12-27.
Bernard, B., Hernandez, R. A., & Nguyen, H., "SPE 120845 Foamed Calcium Aluminate Phosphate Cement Enables Drilling and Cementation of California Geothermal Wells", Society of Petroleum Engineers, 2009, pp. 1-6.

* cited by examiner

MITIGATION OF ANNULAR PRESSURE BUILD-UP USING TREATMENT FLUIDS COMPRISING CALCIUM ALUMINATE CEMENT

BACKGROUND

Methods of using treatment fluids and, more particularly, methods of using treatment fluids comprising calcium aluminate cement in well operations are provided.

Cement compositions may be used in a variety of subterranean operations including operations that utilize treatment fluids. A broad variety of cement compositions have been used as treatment fluids. Extended-life cement compositions are a type of cement composition. In contrast to conventional cement compositions that set and harden upon preparation, extended-life cement compositions are characterized by being capable of remaining in a pumpable fluid state for at least about one day (e.g., about 7 days, about 2 weeks, about 2 years or more) at room temperature (e.g., about 80° F.) in storage. When desired for use, the extended-life cement compositions should be capable of activation and consequently develop reasonable compressive strengths. For example, an extended-life cement composition that is activated may set into a hardened mass.

Annular pressure build-up is an increase in pressure in the wellbore and in wellbore equipment. Annular pressure build-up may rupture casings and cause wellbore collapse. In some examples, annular pressure build-up may occur when treatment fluids or portions of treatment fluids are left behind in the wellbore. Examples of some treatment fluid types which may be left behind include drilling fluids, spacer fluids, flushing fluids, spotting fluids, and the like. These treatment fluids may become trapped in the liquid state during or after the cementing process when cement is circulated above the casing shoe, when bleed-off sections or formation fractures become blocked, or in any other situation that effectively seals the annulus. Heat generated from production or drilling may volatize the treatment fluids leading to thermal expansion of the gas and consequently generating an increase in pressure. As discussed above, this pressure build-up may cause problems in wellbore applications.

Many solutions have been used to mitigate annular pressure build-up including specialized casing and casing accessories, compressible fluids and materials, and operational techniques designed to reduce the risk of annular pressure build-up. These solutions have not proven to be effective. These solutions may have drawbacks, as they have not addressed the source of the problem, which is the use of volatile treatment fluids which may become trapped in the wellbore.

BRIEF DESCRIPTION OF THE DRAWINGS

These drawings illustrate certain aspects of some of the examples of the present method and should not be used to limit or define the method.

DETAILED DESCRIPTION

Figure 1:
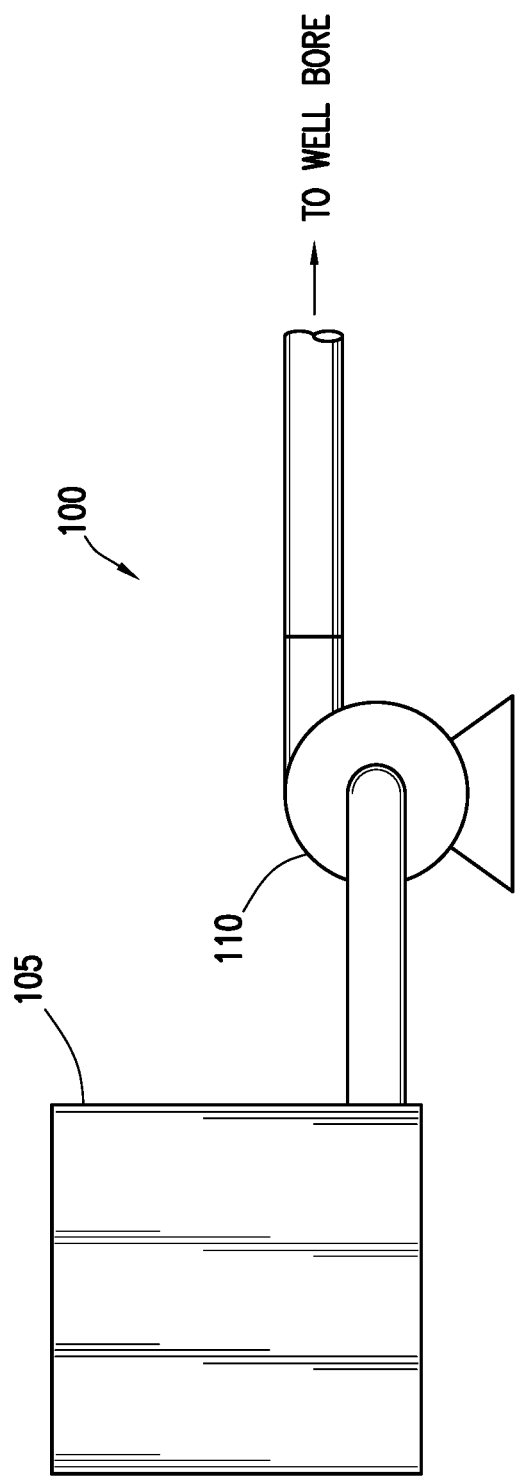
FIG. 1 illustrates surface equipment that may be used in the placement of a treatment fluid in a wellbore in accordance with certain examples.

Methods of using treatment fluids and, more particularly, methods of using treatment fluids comprising calcium aluminate cement compositions in well operations are provided.

The treatment fluids may comprise calcium aluminate cement, water, and a cement set retarder. Optionally, the treatment fluids may comprise a dispersant. Advantageously, the treatment fluids may be capable of remaining in a pumpable fluid state for an extended period of time, i.e., they may be capable of remaining in a pumpable fluid state for at least about one day (e.g., about 7 days, about 2 weeks, about 2 years or more) at room temperature (e.g., about 80° F.) in storage. Generally, the treatment fluids may develop compressive strength after activation. Advantageously, the treatment fluids may develop reasonable compressive strengths at relatively low temperatures (e.g., temperatures of about 70° F. or less to about 140° F.). Thus, while the treatment fluids may be suitable for a number of subterranean cementing operations, they may be particularly suitable for use in subterranean formations having relatively low bottom hole static temperatures, e.g., temperatures of about 70° F. or less to about 140° F. Alternatively, the treatment fluids may be used in subterranean formations having bottom hole static temperatures up to 450° F. or higher.

The treatment fluids may comprise a calcium aluminate cement. Any calcium aluminate cement may be suitable for use. Calcium aluminate cements may be described as cements that comprise calcium aluminates in an amount greater than 50% by weight of the dry calcium aluminate cement (i.e., the calcium aluminate cement before water or any additives are added). A calcium aluminate may be defined as any calcium aluminate including, but not limited to, monocalcium aluminate, monocalcium dialuminate, tricalcium aluminate, dodecacalcium hepta-aluminate, monocalcium hexa-aluminate, dicalcium aluminate, pentacalcium trialuminate, tetracalcium trialuminate, and the like. One example of a suitable such calcium aluminate is SECAR 71° calcium aluminate, which is commercially available from Kerneos™ Aluminate Technologies. Without limitation, the calcium aluminate cement may be included in the treatment fluids in an amount in the range of from about 10% to about 80% by weight of the treatment fluid composition. For example, the calcium aluminate cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the treatment fluid composition. One of ordinary skill in the art, with the benefit of this disclosure, should be able to choose an appropriate type of calcium aluminate cement and should recognize the appropriate amount of the calcium aluminate cement to include for a chosen application.

The treatment fluids may comprise water. The water may be from any source provided that it does not contain an excess of compounds that may undesirably affect other components in the treatment fluids, for example, the water may not contain compounds that raise the alkalinity of the treatment fluids unless it is desirable to do so. The water may comprise fresh water or salt water. Salt water generally may include one or more dissolved salts therein and may be saturated or unsaturated as desired for a particular application. Seawater or brines may be suitable for use in some applications. Further, the water may be present in an amount sufficient to form a pumpable composition. Without limitation, the water may be present in the treatment fluids in an amount in the range of from about 20% to about 90% by weight of the treatment fluid composition. For example, the water may be present in an amount ranging between any of and/or including any of about 20%, about 25%, about 30%, about 35%, about 40%, 45%, about 50%, about 55%, about 60%, about 65%, about 70%, about 75%, about 80%, about 85%, or about 90% by weight of the treatment fluid composition. One of ordinary skill in the art, with the benefit of this disclosure, should be able to recognize the appropriate amount of water to include for a chosen application.

The treatment fluids may comprise a cement set retarder. Examples of the cement set retarder may include, but should not be limited, to hydroxycarboxylic acids such as citric, tartaric, gluconic acids or their respective salts, boric acid or its respective salt, and combinations thereof. A specific example of a suitable cement set retarder is Fe-2™ Iron Sequestering Agent available from Halliburton Energy Services, Inc., Houston, Tex. Generally, the cement set retarder may be present in the treatment fluids in an amount sufficient to delay the setting for a desired time. Without limitation, the cement set retarder may be present in the treatment fluids in an amount in the range of from about 0.01% to about 10% by weight of the calcium aluminate cement. More particularly, the cement set retarder may be present in an amount ranging between any of and/or including any of about 0.01%, about 0.1%, about 1%, about 2%, about 4%, about 6%, about 8%, or about 10% by weight of the calcium aluminate cement. Additionally, it is important to use cement set retarders that do not undesirably affect the treatment fluids, for example, by increasing the pH of the treatment fluids unless desired. One of ordinary skill in the art, with the benefit of this disclosure, should be able to choose an appropriate type of cement set retarder and should recognize the appropriate amount of the cement set retarder to include for a chosen application.

The treatment fluids may optionally comprise a lithium salt which may function as cement set accelerator. A cement set accelerator may accelerate the development of compressive strength once the calcium aluminate cement has been activated, but the cement set accelerator, unless otherwise noted, does not itself induce activation of the calcium aluminate cement. Examples of suitable lithium salts include, without limitation, lithium sulfate and lithium carbonate. Without being limited by theory, it is believed that the lithium ions increase the number of nucleation sites for hydrate formation in the calcium aluminate cement. Thus, when the calcium aluminate cement is activated by combination with cement set activator, the presence of the lithium salts may accelerate the development of compressive strength of the calcium aluminate cement. Preferably, the lithium salt should be added only to retarded or dormant calcium aluminate cements. Introduction of a lithium salt to a non-retarded or non-dormant calcium aluminate cement may undesirably accelerate setting of the calcium aluminate cement, dependent upon the specific calcium aluminate cement used and the other components in the treatment fluids. However, lithium salts added to retarded or dormant calcium aluminate cements may prevent this risk. Without limitation, the lithium salt may be included in the treatment fluids in an amount in the range of about 0.01% to about 10% by weight of the calcium aluminate cement. More particularly, the lithium salt may be present in an amount ranging between any of and/or including any of about 0.01%, about 0.1%, about 0.5%, about 1%, about 2%, about 3%, about 4%, about 5%, or about 10% by weight of the cement. One of ordinary skill in the art, with the benefit of this disclosure, should recognize the appropriate amount of lithium salt to include for a chosen application.

As previously mentioned, the treatment fluids may optionally comprise a dispersant. Examples of suitable dispersants may include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Additionally, polyoxyethylene phosphonates and polyox polycarboxylates may be used. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc., Houston, Tex. The Liquiment® 514L dispersant may comprise 36% by weight of the polycarboxylated ether in water. While a variety of dispersants may be used, some dispersants may be used with, for example, specific cement set retarders. Additionally, dispersants may be used that do not undesirably affect the treatment fluids, for example, by inducing setting. One of ordinary skill in the art, with the benefit of this disclosure, should recognize the appropriate type and amount of dispersant to include for a chosen application.

Without limitation, the dispersant may be included in the treatment fluids in an amount in the range of from about 0.01% to about 5% by weight of the calcium aluminate cement. More particularly, the dispersant may be present in an amount ranging between any of and/or including any of about 0.01%, about 0.1%, about 0.5%, about 1%, about 2%, about 3%, about 4%, or about 5% by weight of the calcium aluminate cement. One of ordinary skill in the art, with the benefit of this disclosure, will recognize the appropriate amount of dispersant to include for a chosen application.

The treatment fluids may optionally comprise a filler material. The filler material used for the treatment fluids may comprise any suitable filler material provided the filler material does not raise the alkalinity of the treatment fluids as this may induce setting of the treatment fluids. Without limitation, the filler material may include silica, sand, fly ash, or silica fume. Generally, the filler material may be present in the treatment fluids in an amount sufficient to make the system economically competitive. Without limitation, the filler material may be present in the treatment fluids in an amount in the range of from about 0.01% to about 100% by weight of the calcium aluminate cement. More particularly, the filler material may be present in an amount ranging between any of and/or including any of about 0.01%, about 0.1%, about 1%, about 10%, about 25%, about 50%, about 75%, or about 100% by weight of the calcium aluminate cement. One of ordinary skill in the art, with the benefit of this disclosure, should recognize the appropriate type and amount of filler material to include for a chosen application.

The treatment fluids may optionally comprise a viscosifier. The viscosifier may be included to optimize fluid rheology and to stabilize the suspension. The viscosifier used for the treatment fluids may comprise any suitable viscosifier provided the viscosifier does not raise the alkalinity of the treatment fluids as this may induce setting of the treatment fluids. Without limitation, examples of viscosifiers include synthetic polymers; swellable clays such as bentonite; inorganic particulates such as microsand, glass beads, and/or manganese oxide; or biopolymers such as cellulose derivatives (e.g., hydroxyethyl cellulose, carboxymethyl cellulose, carboxymethyl hydroxyethyl cellulose). An example of a commercially available viscosifier is SA-1015™ Suspending Agent available from Halliburton Energy Services, Inc., Houston, Tex. Without limitation, the viscosifier may be included in the treatment fluids in an amount in the range of from about 0.01% to about 0.5% by weight of the calcium aluminate cement. In specific embodiments, the viscosifier may be present in an amount ranging between any of and/or including any of about 0.01%, about 0.05%, about 0.1%, about 0.2%, about 0.3%, about 0.4%, or about 0.5% by weight of the cement. One of ordinary skill in the art, with the benefit of this disclosure, will recognize the appropriate type and amount of viscosifier to include for a chosen application.

Other additives suitable for use in well operations also may be added to the treatment fluids as deemed appropriate by one of ordinary skill in the art. Examples of such additives include, but are not limited to, weighting agents, lightweight additives, gas-generating additives, mechanical property enhancing additives, lost-circulation materials, defoaming agents, foaming agents, thixotropic additives, and combinations thereof. Specific examples of these, and other additives include silica (e.g., crystalline silica, amorphous silica, fumed silica, etc.), salts, fibers, hydratable clays, shale (e.g., calcined shale, vitrified shale, etc.), microspheres, diatomaceous earth, natural pozzolan, resins, latex, combinations thereof, and the like. Other optional additives may also be included, including, but not limited to, Class F fly ash, cement, shale, zeolite, metakaolin, pumice, perlite, silica, rice husk ash, combinations thereof, and the like. A person having ordinary skill in the art, with the benefit of this disclosure, will be able to determine the type and amount of additive useful for a particular application and desired result.

Weighting agents are typically materials that weigh more than water and may be used to increase the density of the treatment fluids. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Lightweight additives may be included in the treatment fluids to, for example, decrease the density of the treatment fluids. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in the treatment fluids to release gas at a predetermined time, which may be beneficial to prevent gas migration from the formation through the treatment fluids before they harden. The generated gas may combine with or inhibit the permeation of the treatment fluids by formation gas. Examples of suitable gas-generating additives include, but are not limited to, metal particles (e.g., aluminum powder) that react with an alkaline solution to generate a gas.

Mechanical-property-enhancing additives may be included in the treatment fluids to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in the treatment fluids to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls.

Defoaming additives may be included in the treatment fluids to, for example, reduce the tendency of the treatment fluids to foam during mixing and pumping of the treatment fluids. Examples of suitable defoaming additives include, but are not limited to, polyol silicone compounds. Suitable defoaming additives are available from Halliburton Energy Services, Inc., under the product name D-AIR™ defoamers.

Foaming additives (e.g., foaming surfactants) may be included in the treatment fluids to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEAL-ANT™ 2000 agent, available from Halliburton Energy Services, Houston, Tex.

Thixotropic additives may be included in the treatment fluids to, for example, provide a treatment fluid that may be pumpable as a thin or low viscosity fluid, but when allowed to remain quiescent attains a relatively high viscosity. Among other things, thixotropic additives may be used to help control free water, create rapid gelation as the treatment fluids set, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

When desired for use, the treatment fluids may be pumped into a wellbore to displace or flush a prior placed fluid from the wellbore so that the prior placed fluid may not become trapped. Alternatively, the treatment fluids may be used as substitutes for volatile fluids used in wellbore operations. For example, the treatment fluids may be used as a drilling fluid, spacer fluid, spotting fluid, etc. The treatment fluids may be pumped into the wellbore either to displace a prior placed fluid or to replace another treatment fluid. Any portion of the treatment fluids which become trapped in the annulus or are left behind in the annular pockets or channels may set into a hardened mass when exposed to the temperature increase associated with drilling or production. Because the treatment fluids may set into a hardened mass, they should not volatize, and thus they should not contribute to thermal expansion and the amount annular pressure build-up may be reduced, relative to using volatile fluids in wellbore operations and/or leaving volatile fluids in the wellbore.

In some examples, an optional cement set activator may be added to the treatment fluids when some control over the setting of the treatment fluids is desired. Certain cement set activators may additionally function as cement set accelerators and may accelerate the development of compressive strength in the treatment fluids in addition to activating the extended-life cement compositions. A cement set activator may be any alkaline species that increases the pH of the treatment fluids sufficiently to initiate hydration reactions in the treatment fluids, but also does not otherwise interfere with the setting of the treatment fluids. Without being limited by theory, it is believed that activation may be induced due to the cement set activator removing the hydration barrier caused by the cement set retarders in the treatment fluid composition. Moreover, the large exotherm associated with the setting of the calcium-aluminate cement is believed to provide a large enough temperature increase that the treatment fluids may be able to set at temperatures much lower than other types of settable treatment fluids. Potential examples of cement set activators may include, but should not be limited to: Groups IA and IIA hydroxides such as sodium hydroxide, magnesium hydroxide, and calcium hydroxide; alkaline aluminates such as sodium aluminate; Portland cement; and the like. Without limitation, the cement set activator may be present in the treatment fluids in an amount in the range of from about 0.01% to about 10% by weight of the calcium aluminate cement. More particularly, the cement set activator may be present in an amount ranging between any of and/or including any of about 0.01%, about 0.1%, about 1%, about 2%, about 4%, about 6%, about 8%, or about 10% by weight of the calcium aluminate cement.

As discussed above, the cement set activators may comprise calcium hydroxide which may be referred to as hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included, for example, to activate the treatment fluids.

As discussed above, the cement set activator may comprise a Portland cement or any cement which may increase the pH of the treatment fluid. Examples of such Portland cements, include, but are not limited to Classes A, C, H, or G cements according to the American Petroleum Institute, *API Specification for Materials and Testing for Well Cements*, API Specification 10, Fifth Ed., Jul. 1, 1990. In addition, the Portland cement may include Portland cements classified as ASTM Type I, II, III, IV, or V.

In some examples, it may be desirable to delay the release of a cement set activator added to the treatment fluids. In such examples, the cement set activator may be combined with a binder to produce a delayed-release cement set activator. The binder may be used to provide structure for which to hold cement set activator in one or more masses to allow for the cement set activator to be portioned out. Suitable binders may include, but are not limited to, silica gel, aluminosilicate, chitosan, and cellulose, derivatives thereof, and combinations thereof. The amount of binder used is dependent upon the chosen cement set activator and the desired degree to which the chosen cement set activator is to be bound.

The cement set activator and binder may be combined to form a slurry or paste, and then allowed to dry and harden. Once in a hardened form, the cement set activator may be cut or broken into small particles and sized with a sieve. Generally, the particles should have a size that allows for the particles to be transportable into a subterranean formation and mixed with extended-life cement composition. In some examples, the particles may have a size in a range of about 30 mesh to about 80 mesh. Mesh, as used herein, refers to U.S. standard size mesh.

Due to the bound nature of this sized-particulate form of the delayed-release cement set activator, the delayed-release cement set activator may be released slowly and thus activate the treatment fluids at a slower rate relative to a cement set activator that has not been combined with a binder. In some examples, the release of the delayed-release cement set activator may be further delayed by encapsulating the bound cement set activator with an outer coating (e.g., a degradable coating that degrades downhole) that further impairs the release of the delayed-release cement set activator. As used herein, the term "coating," or "outer coating" and the like, does not imply any particular degree of coating on the particulate. In particular, the terms "coat" or "coating" do not imply 100% coverage by the coating on the particulate. In some embodiments, an outer coating, including degree of coating, may be used to control the rate of release of the delayed-release cement set activator. For example, in a specific example, the outer coating may be configured to impair the release of the delayed-release cement set activator until the treatment fluid has performed its desired function (e.g., flushing other fluids, etc.), wherein the outer coating may degrade due to elevated temperatures within the subterranean formation and the delayed-release cement set activator may be released throughout the treatment fluid. The time period for delay of the release of the cement set activator may be in a range between any of and/or including any of about 1 minute to about 24 hours. For example, the time period for the delay of release may be in a range between any of and/or including any of about 1 minute, about 5 minutes, about 30 minutes, about 1 hour, about 6 hours, about 12 hours, or about 24 hours. Operational factors such as pump rate, conduit dimensions, and the like may influence the time period for delay.

The outer coating may be formed of a water-insoluble material with a melting point of from about 100° F. to about 500° F. A water insoluble material may prevent the outer coating from dissolving in the treatment fluids until desired. Suitable outer coating materials may include, but should not be limited to polysaccharides such as dextran and cellulose, chitins, lipids, latex, wax, chitosans, proteins, aliphatic polyesters, poly(lactides), poly(glycolides), poly(ε-caprolactones), poly(hydroxybutyrates), poly(anhydrides), aliphatic polycarbonates, orthoesters, poly(orthoesters), poly(amino acids), poly(ethylene oxides), polyphosphazenes, derivatives thereof, copolymers thereof, or a combination thereof.

The delayed-release cement set activator (with or without outer coating) may slowly degrade or disassociate in the treatment fluids. This may result in changing the pH of the treatment fluids downhole. The release of the pH altering component from the delayed-release cement set activator may be controlled by time and/or temperature. The delayed-release cement set activator may be formulated to release the pH altering component over time in the wellbore or once the delayed-release cement set activator is exposed to a certain temperature within the wellbore. Because of these adjustable properties, a delayed-release cement set activator may be added to the treatment fluids before and/or during storage, whereas cement set-activators which do not comprise a delayed-release may only be added to a treatment fluid as the treatment fluid is introduced into the subterranean formation or after the treatment fluid has been introduced into the subterranean formation. As such, the delayed-release cement set activator may be dry blended with the treatment fluid and stored, or may be added to a treatment fluid slurry and stored. In these specific examples, the additional mixing steps of adding a nondelayed-release cement set activator may be eliminated, and storage and mixing operations may be simplified as a result. If desired, the delayed-release cement set activator may also be added to the treatment fluid immediately before introducing the treatment fluid into the subterranean formation, or alternatively, the delayed-release cement set activator could be added to the treatment fluid as the treatment fluid is introduced into the subterranean formation. Finally and as discussed above, in some alternatives, no cement set activator is added to the treatment fluids and if some volume of the treatment fluids is left behind or otherwise becomes trapped and cannot be pumped out, the treatment fluids may be activated and set from heat generated by drilling or production operations.

Those of ordinary skill in the art will appreciate that embodiments of the treatment fluids generally should have a density suitable for a particular application. By way of example, the treatment fluids may have a density in the range of from about 4 pounds per gallon ("lb/gal") to about 20 lb/gal. For example, the treatment fluids may have a density in the range of from about 8 lb/gal to about 17 lb/gal. Without limitation, the treatment fluids may be foamed or unfoamed or may comprise other means to reduce their densities, such as hollow microspheres, low-density elastic beads, or other density-reducing additives known in the art. The density may be reduced after storage, but prior to placement in a subterranean formation. Weighting agents may be used to increase the density of the treatment fluids. Examples of suitable weighting agents may include barite, hematite, hausmannite, calcium carbonate, siderite, ilmenite, or combinations thereof. Without limitation, the weighting agents may have a specific gravity of about 3 or greater. Those of ordinary skill in the art, with the benefit of this disclosure, will recognize the appropriate density required for a particular application.

As previously mentioned, the treatment fluids may be capable of remaining in a pumpable fluid state for about one day or longer (e.g., about 1 day, about 2 weeks, about 2 years or more) at room temperature (e.g., about 80° F.) in storage. For example, the treatment fluids may remain in a pumpable fluid state for a period of time from about 1 day to about 7 days or more. Without limitation, the treatment fluids may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, Jul. 2005. Without limitation, a treatment fluid that has been activated (e.g., by heat generated from drilling or production operations) may set to form a hardened mass in a time period in the range of from about 1 hour to about 12 days. For example, the treatment fluids may set to form a hardened mass in a time period ranging between any of and/or including any of about 1 hour, about 6 hours, about 12 hours, about 1 day, about 2 days, about 4 days, about 6 days, about 8 days, about 10 days, or about 12 days.

The treatment fluids may set to have a desirable compressive strength after activation. Compressive strength is generally the capacity of a material or structure to withstand axially directed pushing forces. The compressive strength may be measured at a specified time after the activation of the calcium aluminate cement while the treatment fluid is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, Jul. 2005.

By way of example, the treatment fluids may develop a 24-hour compressive strength in the range of from about 50 psi to about 5000 psi, alternatively, from about 100 psi to about 4500 psi, or alternatively from about 500 psi to about 4000 psi. In particular, the treatment fluids may develop a compressive strength in 24 hours of at least about 50 psi, at least about 100 psi, at least about 500 psi, or more. The compressive strength values may be determined using destructive or non-destructive methods at any temperature, however compressive strength development at temperatures ranging from 70° F. to 140° F. may be of particular importance for potential use in subterranean formations having relatively low bottom hole static temperatures.

In some examples, the treatment fluids may have desirable thickening times. Thickening time typically refers to the time a fluid, such as a treatment fluid, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. The treatment fluids may have thickening times greater than about 1 hour, alternatively, greater than about 2 hours, greater than about 15 hours, greater than about 30 hours, greater than about 100 hours, or alternatively greater than about 190 hours at 3,000 psi and temperatures in a range of from about 50° F. to about 400° F., alternatively, in a range of from about 70° F. to about 140° F., and alternatively at a temperature of about 100° F. Thickening times may be controlled by the temperature of the treatment fluid or the pH of the treatment fluid. This is related, to a degree, to the temperature increase in the formation due to wellbore operations such as drilling or production and/or the concentration of any cement set activator added to the treatment fluid. Control of temperature and/or cement set activator concentration allows for a quantitative method of controlling the set time of the treatment fluids.

In addition to using the treatment fluids to displace or flush prior placed fluids, the treatment fluids described above may be used in a variety of applications. For example, the treatment fluids disclosed herein may be used as a drilling fluid for drilling a wellbore in a subterranean formation by circulating a treatment fluid while drilling a wellbore in contact with a drill bit and a subterranean formation. After the treatment fluids are used to drill a wellbore in a subterranean formation, a casing may be placed within the wellbore.

A method of treating a well may be provided. The method may include one or all of the components and/or steps illustrated in FIGS. 1-3. The method may comprise introducing a treatment fluid comprising a calcium aluminate cement, a cement set retarder, and water into a wellbore; and removing a portion of the treatment fluid from the wellbore. Introducing the treatment fluid into the wellbore may comprise introducing the treatment fluid into the wellbore while a drill bit is present in the wellbore. Introducing the treatment fluid into the wellbore may displace at least a portion of a drilling fluid from the wellbore. The treatment fluid may be used as a drilling fluid, a displacement fluid, or a spotting fluid. Another a portion of the treatment fluid may remain in the wellbore. Another portion of the treatment fluid may be allowed to remain static in the wellbore and the portion may remain in a pumpable fluid state for a period of about 1 day or longer while static in the wellbore. The treatment fluid may not comprise a cement set activator. The cement set retarder may be selected from the group consisting of hydroxycarboxylic acids or their respective salts, boric acid or its respective salt, and any combination thereof. The cement set retarder may be present in an amount of about 0.01% to about 10% by weight of the calcium aluminate cement. The treatment fluid may further comprise a dispersant selected from the group consisting of a sulfonated-formaldehyde-based dispersant, a polycarboxylated ether dispersant, and any combination thereof. The dispersant may be present in an amount of about 0.01% to about 5% by weight of the calcium aluminate cement.

A method of treating a well may be provided. The method may include one or all of the components and/or steps illustrated in FIGS. 1-3. The method may comprise introducing a treatment fluid comprising a calcium aluminate cement, a cement set retarder, and water into a wellbore; contacting a prior placed fluid in the wellbore with the treatment fluid; displacing a portion of the prior placed fluid from the wellbore; and removing a portion of the treatment fluid from the wellbore. The treatment fluid may be used as a drilling fluid, a displacement fluid, or a spotting fluid. Another portion of the treatment fluid may remain in the wellbore. Another portion of the treatment fluid may be allowed to remain static in the wellbore and the portion may remain in a pumpable fluid state for a period of about 1 day or longer while static in the wellbore. The treatment fluid may not comprise a cement set activator. The cement set retarder may be selected from the group consisting of hydroxycarboxylic acids or their respective salts, boric acid or its respective salt, and any combination thereof. The cement set retarder may be present in an amount of about 0.01% to about 10% by weight of the calcium aluminate cement. The treatment fluid may further comprise a dispersant selected from the group consisting of a sulfonated-formaldehyde-based dispersant, a polycarboxylated ether dispersant, and any combination thereof. The dispersant may be present in an amount of about 0.01% to about 5% by weight of the calcium aluminate cement.

A system of treating a well may be provided. The system may include one or all of the components illustrated in FIGS. 1-3. The system for treating a well comprises a treatment fluid comprising calcium-aluminate cement, water, and a cement set retarder; a vessel to contain the treatment fluid; a pumping system coupled to the vessel to pump the treatment fluid; and a conduit coupled to the pumping system. The system may further comprise a storage system for storing the treatment fluid. The system may further comprise a drilling system for drilling a wellbore. The treatment fluid may be used as a drilling fluid, a displacement fluid, or a spotting fluid. A portion of the treatment fluid may remain in the wellbore. A portion of the treatment fluid may be allowed to remain static in the wellbore and the portion may remain in a pumpable fluid state for a period of about 1 day or longer while static in the wellbore. The treatment fluid may not comprise a cement set activator. The cement set retarder may be selected from the group consisting of hydroxycarboxylic acids or their respective salts, boric acid or its respective salt, and any combination thereof. The cement set retarder may be present in an amount of about 0.01% to about 10% by weight of the calcium aluminate cement. The treatment fluid may further comprise a dispersant selected from the group consisting of a sulfonated-formaldehyde-based dispersant, a polycarboxylated ether dispersant, and any combination thereof. The dispersant may be present in an amount of about 0.01% to about 5% by weight of the calcium aluminate cement.

The example treatment fluids disclosed herein may directly or indirectly affect one or more components or pieces of equipment associated with the preparation, delivery, recapture, recycling, reuse, and/or disposal of the disclosed treatment fluids. Any of the treatment fluids described herein may be contained within a vessel and/or any type of sufficient storage system. Without limitation, examples of such vessels, may include mud pits, barrels, mixers, drums, trucks, storage containers, etc. Some of the example vessels may comprise mixing equipment, for example, baffles. Any of the vessel examples may be coupled to any of the pumps, pumping systems, conduits, or fluid recovery systems disclosed herein. Any of the pumps, pumping systems, or conduits disclosed herein may be coupled to one another as well as any other upstream or downstream system or equipment, such as vessels, storage systems, fluid recovery systems, and the like. Further, fluid recovery systems comprising vessels and/or pumping systems may be used to recover any of the treatment fluids described herein. These recovered treatment fluids may be reconditioned and recycled, may be stored (e.g., using a storage system or vessel), or may simply be reused.

The treatment fluids disclosed herein may be used to flush a prior placed fluid. For example, the treatment fluids may be used to displace a drilling mud or other treatment fluid, e.g., by circulating a treatment fluid back to the surface via the annulus between the drill string and the walls of the wellbore. As the treatment fluid is circulated back to the surface, it displaces any prior placed fluids remaining in the wellbore. Any portion of the treatment fluid that remains in the wellbore or becomes trapped in the wellbore may set into a hardened mass (e.g. after activation from heat generated during drilling or production operations) and not volatize or otherwise generate an expansive gas.

The density of the treatment fluids may be adjusted by the addition of water and/or a viscosifier. The water and/or viscosifier may be added in any amount to achieve the appropriate density for a rheological hierarchy for a given application. An example of a suitable viscosifier is SA-1015™ suspending agent available from Halliburton Energy Services, Houston, Tex. Additionally, light weight additives and weighting agents may also be added to adjust the density as is appropriate to maintain the rheological hierarchy. One of ordinary skill in the art, with the benefit of this disclosure, will recognize the appropriate density and method of density adjustment necessary for a chosen application.

The treatment fluids may also be foamed with a foaming additive and/or a gas, for example, to provide a treatment fluid with a reduced density. The gas used for foaming the treatment fluids may be any suitable gas for foaming, including, but not limited to: air, nitrogen, and combinations thereof. Generally, the gas should be in an amount sufficient to form the desired foam. Foaming additives may be included in embodiments to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

Figure 2:
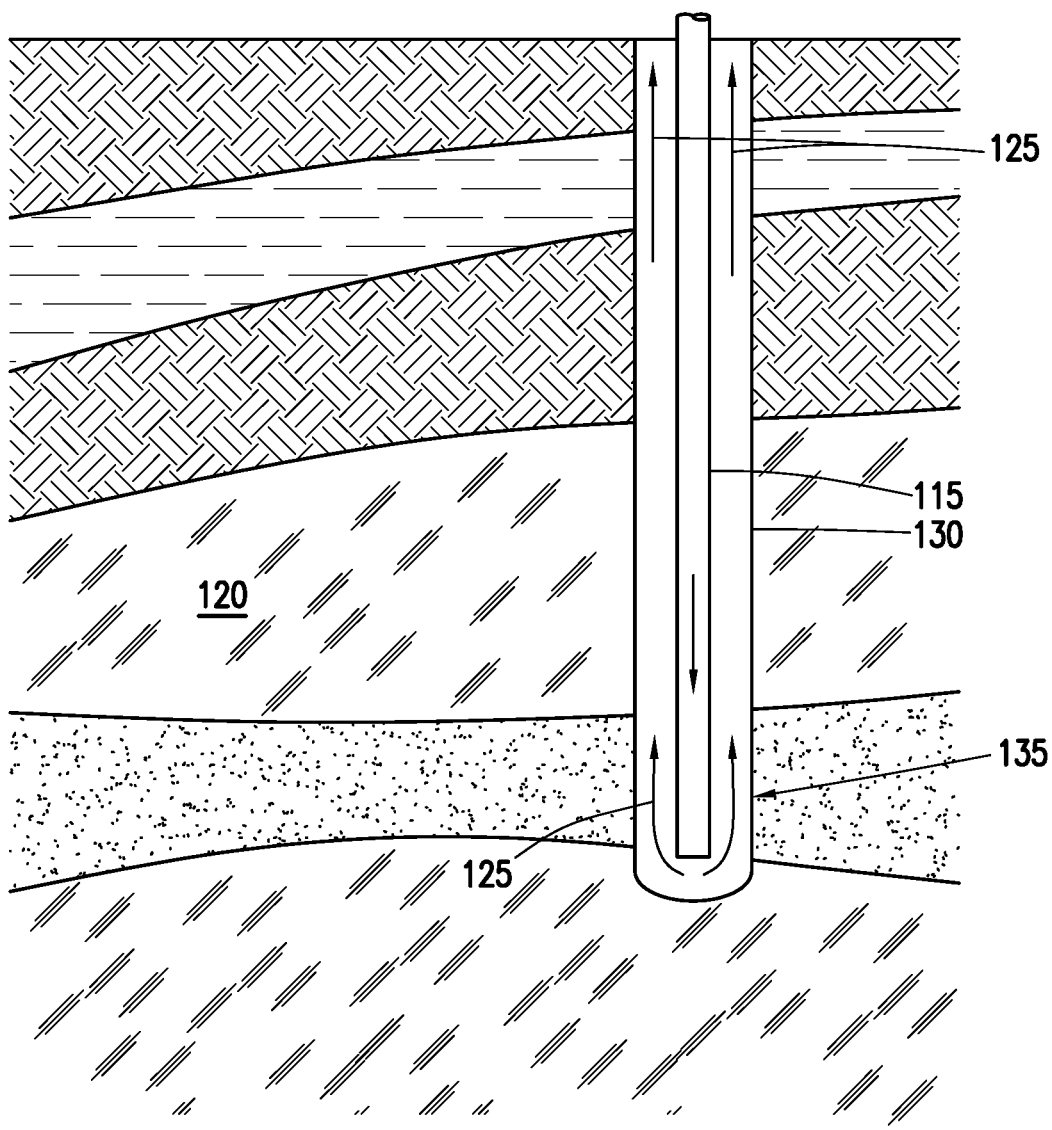
FIG. 2 illustrates a method for displacing a prior placed fluid using a treatment fluid.

Referring now to FIG. 1, a fluid handling system 100 is illustrated. A treatment fluid comprising a calcium aluminate cement, water, and a cement set retarder may be mixed in mixing equipment 105, such as a mixer, recirculating tub, or any type of vessel comprising mixing equipment, and then pumped via pump 110 or any type of pumping system to the wellbore. As illustrated in FIG. 2, the treatment fluid and any subsequent fluid (e.g., a cement composition) may be pumped into the casing 115 in the direction shown by the arrows. The treatment fluid may be pumped through the casing 115, a type of conduit, and through or into the subterranean formation 120 until it reaches the end point and is pushed upward into the annulus 125 which resides between the casing 115 and walls 130 of wellbore 135. The treatment fluid may displace any prior placed fluid (e.g., a drilling fluid) and may also separate any subsequently pumped fluid (e.g., a cement composition). The treatment fluid may be pumped out of the wellbore 135, however, as discussed above, should any of the treatment fluid become trapped in the annulus and not be pumped out of the wellbore 135, the remaining portion may set into a hardened mass (e.g. after activation from heat generated during drilling or production operations) and not volatize or otherwise generate an expansive gas.

The treatment fluids disclosed herein may be used as a replacement for the types of treatment fluids, for example as a drilling fluid. When used as a drilling fluid, such drilling fluids may comprise the formulations of the disclosed treatment fluids discussed above. The disclosed treatment fluids may be used to aid in the drilling of a wellbore, e.g., by circulating drill cuttings back to the surface via the annulus between the drill string and the walls of the wellbore. If desired, the drilling fluid may be permitted to set behind the casing.

Figure 3:
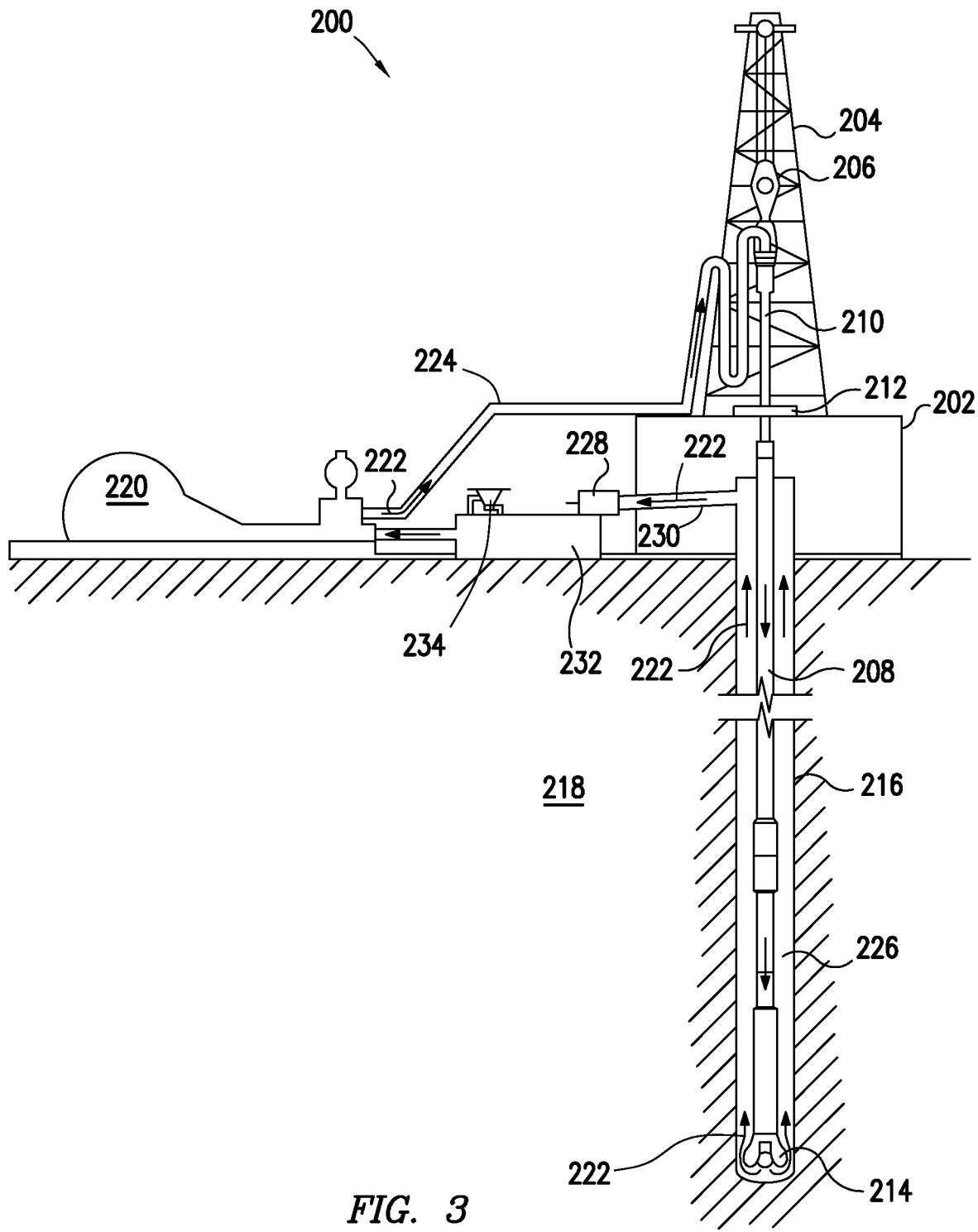
FIG. 3 illustrates a system for preparation and delivery of a drilling fluid to a wellbore in accordance with certain examples.

With reference to FIG. 3, the disclosed treatment fluids may directly or indirectly affect one or more components or pieces of equipment associated with an example wellbore drilling assembly 200. It should be noted that while FIG. 3 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 200 may include a drilling platform 202 that supports a derrick 204 having a traveling block 206 for raising and lowering a drill string 208. The drill string 208 may include, but is not limited to, conduits such as drill pipe and coiled tubing, as generally known to those skilled in the art. A kelly 210 supports the drill string 208 as it is lowered through a rotary table 212. A drill bit 214 is attached to the distal end of the drill string 208 and is driven either by a downhole motor and/or via rotation of the drill string 208 from the well surface. As the bit 214 rotates, it creates a borehole 216 that penetrates various subterranean formations 218.

A pump 220 (e.g., a mud pump) circulates drilling fluid 222, which may have been stored in a vessel prior to use, comprising at least one of the treatment fluids disclosed herein, through a feed pipe 224 and to the kelly 210, which conveys the drilling fluid 222 downhole through the interior of the drill string 208 and through one or more orifices in the drill bit 214. The pump 220 may be part of a pumping system. The drilling fluid 222 is then circulated back to the surface via an annulus 226 defined between the drill string 208 and the walls of the borehole 216. At the surface, the recirculated or spent drilling fluid 222 exits the annulus 226 and may be conveyed to one or more fluid processing unit(s) 228 via an interconnecting flow line 230. After passing through the fluid processing unit(s) 228, a "cleaned" drilling fluid 222 is deposited into a nearby retention pit 232 (i.e., a mud pit), which may function as a vessel or storage system for the drilling fluid. While illustrated as being arranged at the outlet of the wellbore 216 via the annulus 226, those skilled in the art will readily appreciate that the fluid processing unit(s) 228 may be arranged at any other location in the drilling assembly 200 to facilitate its proper function, without departing from the scope of the scope of the disclosure. The drilling fluid may be pumped out of the wellbore 216, however, as discussed above, should any of the drilling fluid become trapped in the annulus and not be pumped out of the wellbore 216, the remaining portion may set into a hardened mass (e.g. after activation from heat generated during drilling or production operations) and not volatize or otherwise generate an expansive gas.

The drilling fluid 222 may be added to a mixing hopper 234, a type of vessel, communicably coupled to or otherwise in fluid communication with the retention pit 232. The mixing hopper 234 may include, but is not limited to, mixers and related mixing equipment known to those skilled in the art. In alternative embodiments, however, the drilling fluid 222 may not be added to a mixing hopper. In at least one example, there could be more than one retention pit 232, such as multiple retention pits 232 in series. Moreover, the retention pit 232 may be representative of one or more fluid storage facilities and/or units where the disclosed treatment fluids may be stored, reconditioned, and/or regulated until used as a treatment fluid, for example, as a drilling fluid 222.

As mentioned above, the drilling fluid 222 may directly or indirectly affect the components and equipment of the drilling assembly 200. For example, the drilling fluid may directly or indirectly affect the fluid processing unit(s) 228 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 228 may further include one or more sensors, gauges, pumps, compressors, and the like used store, monitor, regulate, and/or recondition the treatment fluids.

The disclosed drilling fluids may directly or indirectly affect the pump 220 and any pumping systems, which representatively includes any conduits, pipelines, trucks, tubulars, and/or pipes which may be coupled to the pump and/or any pumping systems and may be used to fluidically convey the drilling fluid downhole, any pumps, compressors, or motors (e.g., topside or downhole) used to drive the drilling fluid into motion, any valves or related joints used to regulate the pressure or flow rate of the drilling fluid, and any sensors (i.e., pressure, temperature, flow rate, etc.), gauges, and/or combinations thereof, and the like. The disclosed drilling fluids may also directly or indirectly affect the mixing hopper 234 and the retention pit 232 and their assorted variations.

The disclosed drilling fluids may also directly or indirectly affect the various downhole equipment and tools that may come into contact with the drilling fluids such as, but not limited to, the drill string 208, any floats, drill collars, mud motors, downhole motors and/or pumps associated with the drill string 208, and any MWD/LWD tools and related telemetry equipment, sensors or distributed sensors associated with the drill string 208. The disclosed drilling fluids may also directly or indirectly affect any downhole heat exchangers, valves and corresponding actuation devices, tool seals, packers and other wellbore isolation devices or components, and the like associated with the wellbore 216. The drilling fluids may also directly or indirectly affect the drill bit 214, which may include, but is not limited to, roller cone bits, PDC bits, natural diamond bits, any hole openers, reamers, coring bits, etc.

While not specifically illustrated herein, the drilling fluids may also directly or indirectly affect any transport or delivery equipment used to convey the drilling fluids to the drilling assembly 200 such as, for example, any transport vessels, conduits, pipelines, trucks, tubulars, and/or pipes used to fluidically move the drilling fluids from one location to another, any pumps, compressors, or motors used to drive the drilling fluids into motion, any valves or related joints used to regulate the pressure or flow rate of the drilling fluids, and any sensors (i.e., pressure and temperature), gauges, and/or combinations thereof, and the like.

The exemplary treatment fluids disclosed herein may directly or indirectly affect one or more components or pieces of equipment associated with the preparation, delivery, recapture, recycling, reuse, and/or disposal of the disclosed treatment fluids. For example, the disclosed treatment fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of the treatment fluids, and any sensors (i.e., pressure and temperature), gauges, and/or combinations thereof, and the like. The disclosed treatment fluids may also directly or indirectly affect the various downhole equipment and tools that may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present claims, the following examples of certain aspects of the disclosure are given. In no way should the following examples be read to limit, or define, the entire scope of the claims.

Example 1

A treatment fluid sample was obtained which comprised about 40% to about 70% calcium aluminate cement by weight, about 33% to about 200% water by weight, about 0.01% to about 10% cement set retarder by weight, and about 0.01% to about 5% dispersant by weight. In the examples, the terms "by weight" or "by wt." refers to by weight of the treatment fluid. The treatment fluid was obtained from Kemeos, Inc., Chesapeake, Va.; as a retarded calcium-aluminate system comprising a suspension of calcium-aluminate cement that was 40-70% solids. The calculated density of the treatment fluid was 14.68 ppg.

The apparent viscosities and FYSA decay readings of the sample were measured at Day 0 and after storage at Day 48 using a Model 35A Fann® Viscometer and a No. 2 spring with a Fann® Yield Stress Adapter (FYSA), in accordance with the procedure set forth in API RP Practice 10B-2, *Recommended Practice for Testing Well Cements*. The data is presented in Table 1 below.

TABLE 1

| Treatment Fluid Rheological Profile | | | | | | | | |
|---|---|---|---|---|---|---|---|---|
| | FYSA Readings | | | | | | | |
| | 3 | 6 | 100 | 200 | 300 | 600 | 3D | 6D |
| Day 0 | 17759 | 10212 | 1305 | 839 | 666 | 506 | 7 | 4 |
| Day 48 | 16871 | 9768 | 1265 | 806 | 644 | 506 | 5.5 | 5.5 |

As shown by these measurements, the slurry rheology remained stable for at least 48 days with little to no change in the calculated apparent viscosity. No settling of solids or free fluid was observed in the samples over the test period further supporting the high degree of slurry stability. At 181 days, there was no settling or free fluid even though the apparent viscosity had increased. Any gel that had formed, and which contributed to the increased viscosity, was easily broken upon stirring to return the slurry back to a flowable, pourable slurry.

Example 2

Another sample identical to that used in Example 1 with a pH of 6.3 was subjected to a thickening time test on a high-temperature high-pressure consistometer with a programmed ramp to 250° F. with a 6 hour hold, followed by a ramp to 350° F. where the temperature was held for the remainder of the test in accordance with the procedure for determining cement thickening times set forth in API RP Practice 10B-2, *Recommended Practice for Testing Well Cements*, First Edition, Jul. 2005. The thickening time is the time for the treatment fluid to reach 70 Bc and may be reported as the time to reach 70 Bc. The results of this test are set forth below in Table 2.

TABLE 2

| Treatment Fluid Thickening Time Measurements | |
|---|---|
| 30 Bc TT (hr:mm:ss) | 13:40:00 |
| 70 Bc TT (hr:mm:ss) | 13:40:30 |
| 100 Bc TT (hr:mm:ss) | 13:41:00 |

The sample did not reach a 70 Bc consistency during the 6 hour hold at 250° F. At the temperature of 350° F., the sample reached 70 Bc at 13:40:30. The data thus indicates that the treatment fluids may be thermally activated, yet remain fluid and pumpable at temperatures as high as 350° F. Therefore, the formation temperature as well as heat generated from wellbore applications may induce setting of any residual volume of the treatment fluids trapped in the wellbore. As such the treatment fluids may be used to flush or replace any volatile trapped (or potentially trapped) annular fluids.

Further, it was shown that the sample exhibited "right-angle" set behavior, indicating a rapid phase transition from the fluid phase to the solid phase. Right-angle set behavior is generally described as slurry that maintains a low consistency, for example, less than 30 Bc, until the thickening time is reached at which point the slurry rapidly gains high levels of strength. This may be beneficial in some applications because, for example, a treatment fluid with right-angle set behavior may reduce concerns that the treatment fluid may gel or set while operations are ongoing, for example, while drilling if the treatment fluid is being used as a drilling fluid.

Example 3

A sample identical to that used in Examples 1 and 2 was activated by the addition of a 1% by weight 4M NaOH (aq.) solution to bring the pH of the sample to 8.5. The sample was split into four separate experimental samples and the thickening times of the four samples were measured on a high-temperature high-pressure consistometer by ramping from room temperature (e.g., about 70° F. for this example) and ambient pressure to a temperature of either 100° F., 140° F., 180° F., or 220° F. in 15 minutes, 35 minutes, 55 minutes, or 75 minutes respectively (i.e. a ramp of 2° F./min.), while holding the pressure constant at 3000 psi; in accordance with the procedure for determining cement thickening times set forth in API RP Practice 10B-2, *Recommended Practice for Testing Well Cements*, First Edition, Jul. 2005. The thickening time is the time for the treatment fluid to reach 70 Bc and may be reported as the time to reach 70 Bc. The results of this test are set forth below in Table 3.

TABLE 3

| Treatment Fluid Thickening Time Measurements | |
|---|---|
| Temperature (° F.) | Thickening Time (hr:mm) |
| 100 | 190+ |
| 140 | 47.25 |
| 180 | 20.25 |
| 220 | 11 |

The results illustrate that the thickening times are dependent upon temperature and also the pH of the treatment fluids. The effect of temperature does not appear to effect the thickening times in a significant manner unless the temperature is greater than 100° F. (for a pH of 8.5). Thus, the temperature and the pH of the treatment fluids should be considered when calculating thickening times.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method of treating a well comprising:
   storing a treatment fluid comprising a calcium aluminate cement, a cement set retarder present in an amount of about 0.01% to about 10% by weight of the calcium aluminate cement, a dispersant, and water in a pumpable fluid state for at least about 1 day, wherein the calcium aluminate cement comprises calcium aluminates in an amount greater than 50% by weight of dry calcium aluminate cement;
   introducing the treatment fluid into a wellbore without the calcium aluminate cement being activated, wherein the calcium aluminate cement is present in the treatment fluid in an amount of about 40% to about 70% by weight of the treatment fluid; and
   removing a portion of the treatment fluid from the wellbore, wherein of the treatment fluid remaining in the wellbore remains static and in a pumpable fluid state for a period of about 1 day or longer,
   wherein the treatment fluid remaining static in the wellbore is activated by heat and remains fluid and pumpable up to 350° F., and wherein the treatment fluid remaining static in the wellbore and activated by heat sets into a hardened mass, wherein the portion of the treatment fluid removed from the wellbore is removed before the treatment fluid remaining static in the wellbore sets into a hardened mass.

2. The method of claim 1, wherein the introducing the treatment fluid into the wellbore comprises introducing the treatment fluid into the wellbore while a drill bit is present in the wellbore.

3. The method of claim 1, wherein the introducing the treatment fluid into the wellbore displaces at least a portion of a drilling fluid from the wellbore.

4. The method of claim 1 wherein the treatment fluid is used as a drilling fluid, a displacement fluid, or a spotting fluid.

5. The method of claim 1, wherein the treatment fluid comprises a suspension of the calcium aluminate, wherein the calcium aluminate is comprised of solids in an amount of 40% to 70%.

6. The method of claim 1, wherein the calcium-aluminate is selected from the group consisting of monocalcium dialuminate, tri calcium aluminate, dodecacalcium hepta-aluminate, monocalcium hexa-aluminate, dicalcium aluminate, pentacalcium trialuminate, tetracalcium trialuminate, and combinations thereof.

7. The method of claim 1, wherein the treatment fluid does not comprise a cement set activator.

8. The method of claim 1, wherein the cement set retarder is selected from the group consisting of hydroxycarboxylic acids or their respective salts, boric acid or its respective salt, and any combination thereof.

9. The method of claim 1, wherein the cement set retarder is present in an amount of about 1% to about 5% by weight of the calcium aluminate cement.

10. The method of claim 1, wherein the dispersant selected from the group consisting of a sulfonated-formaldehyde-based dispersant, a polycarboxylated ether dispersant, and any combination thereof.

11. The method of claim 10, wherein the dispersant is present in an amount of about 0.01% to about 5% by weight of the calcium aluminate cement.

12. A method of treating a well comprising:
    storing a treatment fluid comprising a calcium aluminate cement in an amount of about 40% to about 70% by weight of the treatment fluid, a cement set retarder present in an amount of about 0.01% to about 10% by weight of the calcium aluminate cement, a dispersant, and water in a pumpable fluid state for at least about 1 day, wherein the calcium aluminate cement comprises calcium aluminates in an amount greater than 50% by weight of dry calcium aluminate cement;
    introducing the treatment fluid into a wellbore without the calcium aluminate cement being activated;
    contacting a prior placed fluid in the wellbore with the treatment fluid;
    displacing a portion of the prior placed fluid from the wellbore; and
    removing a portion of the treatment fluid from the wellbore, wherein the treatment fluid remaining in the wellbore remains static and in a pumpable fluid state for a period of about 1 day or longer,
    wherein the treatment fluid remaining static in the wellbore is activated by heat and remains fluid and pumpable up to 350° F., and wherein treatment fluid remaining static in the wellbore and activated by heat sets into a hardened mass, wherein the portion of the treatment fluid removed from the wellbore is removed before the treatment fluid remaining static in the wellbore sets into a hardened mass.

13. The method of claim 12, wherein the treatment fluid does not comprise a cement set activator.

14. A system for treating a well comprising:
    a treatment fluid comprising:
      calcium aluminate cement in an amount of about 40% to about 70% by weight of the treatment fluid, wherein the calcium aluminate cement comprises calcium aluminates in an amount greater than 50% by weight of dry calcium aluminate cement;
      water,
      a cement set retarder present in an amount of about 0.01% to about 10% by weight of the calcium aluminate cement, and
      a dispersant
    a vessel to contain the treatment fluid; and
    a pumping system coupled to the well and the vessel to pump the treatment fluid into the well, wherein the calcium aluminate cement is not activated, wherein a portion of the treatment fluid remains static in the well in a pumpable fluid state for a period of about 1 day or longer, and wherein, after activation from heat the treatment fluid remains fluid and pumpable up to 350° F., wherein the treatment fluid in the well sets into a hardened mass, and wherein another portion of the treatment fluid is removed from the wellbore before the portion of treatment fluid remaining static in the well sets into a hardened mass.

15. The system of claim 14 further comprising a storage system for storing the treatment fluid.

16. The system of claim 14 further comprising a drilling system for drilling a wellbore.

17. The system of claim 14, wherein the cement set retarder is selected from the group consisting of hydroxycarboxylic acids or their respective salts, boric acid or its respective salt, and any combination thereof.

18. The method of claim 1, wherein any portion of the treatment fluid left behind in the wellbore sets into a hardened mass, after activation from a temperature increase.

19. The method of claim 1, wherein the calcium-aluminate is selected from the group consisting of monocalcium aluminate, monocalcium dialuminate, tri calcium aluminate, dodecacalcium hepta-aluminate, monocalcium hexa-aluminate, dicalcium aluminate, pentacalcium trialuminate, tetracalcium trialuminate, and combinations thereof.

20. The method of claim 12, wherein the calcium-aluminate is selected from the group consisting of monocalcium aluminate, monocalcium dialuminate, tri calcium aluminate, dodecacalcium hepta-aluminate, monocalcium hexa-aluminate, dicalcium aluminate, pentacalcium trialuminate, tetracalcium trialuminate, and combinations thereof.

21. The system of claim 14, wherein the calcium-aluminate is selected from the group consisting of monocalcium aluminate, monocalcium dialuminate, tri calcium aluminate, dodecacalcium hepta-aluminate, monocalcium hexa-aluminate, dicalcium aluminate, pentacalcium trialuminate, tetracalcium trialuminate, and combinations thereof.

* * * * *